(12) United States Patent
Hannah et al.

(10) Patent No.: US 8,061,263 B1
(45) Date of Patent: Nov. 22, 2011

(54) SENSOR HEAD AND BREW CUP FOR A BEVERAGE BREWING DEVICE

(75) Inventors: Gary Ray Hannah, Shawnee, KS (US); Richard William Heim, Shawnee, KS (US)

(73) Assignees: Richard W. Hein, Shawnee, KS (US); Gary R. Hannah, Shawnee, KS (US)

(*) Notice: Subject to any disclaimer, the term of this patent is extended or adjusted under 35 U.S.C. 154(b) by 867 days.

(21) Appl. No.: 12/102,834

(22) Filed: Apr. 14, 2008

Related U.S. Application Data

(60) Provisional application No. 60/912,162, filed on Apr. 16, 2007.

(51) Int. Cl.
*A47J 31/40* (2006.01)
*A47B 73/00* (2006.01)

(52) U.S. Cl. ........ 99/280; 99/279; 99/284; 99/282; 99/288; 99/289 R; 99/295; 99/299; 99/302 R; 99/303; 99/305; 99/306; 99/307; 211/74; 73/304 R; 116/107; 116/227

(58) Field of Classification Search ........ 248/240.4; 211/74; 116/107, 227; 99/279–284, 288–9 R, 99/295, 299, 302 R–303, 305–7; 73/304 R
See application file for complete search history.

(56) References Cited

U.S. PATENT DOCUMENTS

| | | | | |
|---|---|---|---|---|
| 3,519,769 A | * | 7/1970 | Grimes | ........ 200/61.05 |
| 4,949,627 A | | 8/1990 | Nordskog | |
| 6,047,630 A | | 4/2000 | Brown | |
| 6,050,175 A | | 4/2000 | Mirand | |
| 6,227,101 B1 | | 5/2001 | Rabadi | |
| 6,779,435 B1 | | 8/2004 | Iacobucci | |
| 7,017,408 B2 | | 3/2006 | Ramus | |
| 7,210,400 B2 | | 5/2007 | Kaminishi | |

* cited by examiner

*Primary Examiner* — Shawntina Fuqua

(57) ABSTRACT

A sensor head/brew cup with liquid level sensor probes which rotate down into the server to avoid damage to the probes by the server. The sensor head/brew cup moves as a unit, thereby eliminating any gap between the brew cup and the sensor head through which the brewed liquid must pour, thereby preventing spillage. The moveable sensor head/brew allows beverage brewing devices to use servers of various heights. Raising the sensor head/brew cup causes the level sensor probes to rotate upward out of the server, thereby protecting the probes from impact by the server when it is removed from the brewing device. When the level sensor probes are in the upward position they touch electrical contacts completing a self-test circuit confirming electrical continuity through the level sensor probes.

14 Claims, 6 Drawing Sheets

SENSOR HEAD AND BREW CUP FOR A BEVERAGE BREWING DEVICE

CROSS-REFERENCE TO RELATED APPLICATIONS

This application claims benefit of provisional patent application Ser. No. 60/912,162, filed 2007 Apr. 16 by the present inventors.

FEDERALLY SPONSORED RESEARCH

Not Applicable

SEQUENCE LISTING OR PROGRAM

Not Applicable

BACKGROUND

1. Field of Invention

This invention relates to sensing the fluid level in a server as used in a beverage brewing device, and securing servers of various heights in a beverage brewing device, such as a coffee maker.

2. Prior Art

Coffee makers on aircraft are used many times per month and therefore must be very reliable. The current art, U.S. Pat. No. 4,949,627, uses "swingably" mounted electrodes to detect when the coffee maker server is full and to therefore stop filling the server. These electrodes are conductive metal segments linked together by conductive pins, bolts, and nuts. The problem with this design is the fact that over time coffee residue builds up between the links and between the pins and links. This residue reduces the electrical conductivity of the electrode linkage, and thus renders the electrode sensor inoperable and causing the server to overflow. One conventional technique for solving the problem of residue interrupting electrical conductivity in electrodes is to use a probe without links. Instead of "swingably" mounted electrodes, probes mounted with springs are used. This provides an electrode without gaps to become contaminated. These probes are always oriented downward into the server. When the server is put into the coffee maker the probes are pushed out of the way by the server and then flex back into position inside the server. A problem occurs if the server is not pushed fully into position in the coffee maker. The probes of the current art will not spring back inside the server opening and the coffee maker will overfill the server since the probes are outside the server. Another problem with the current art occurs because the spring mounted probes become damaged over time with repeated flexing of the mounting springs and being repeatedly impacted by the server. The current art, U.S. Pat. No. 7,017,408, attempted to eliminate the mechanical failures associated with spring mounted probes by replacing conductive probes with infrared light emitting diodes (IRED) to detect the liquid level in the server. The IRED concept has problems with the lenses becoming dirty from steam and coffee residue which cause the IRED concept to not detect the liquid surface and therefore overfilling the occurs. The IRED also has difficulty detecting the liquid surface when the surface is vibrating due to aircraft vibration. The IRED concept also has errors detecting the maximum allowed surface level when the aircraft is not in level flight since the liquid surface is not horizontal. Problems also occur with the IRED concept in detecting the liquid surface due to the presence of steam. All of these problems cause the IRED concept to overflow the server.

Another problem with the current art, U.S. Pat. No. 6,227,101, is the use of a stationary brew tray. The brew tray is in a fixed position and brewed liquid exits the "tray access port" through a "shelf access hole" and then into the coffee pot. This requires the brewed liquid to pour across a gap between the "shelf access hole" and the coffee pot. When the aircraft is not in level flight, the liquid travelling across this gap can miss entering the coffee pot, causing spillage. In order to minimize the gap across which the brewed liquid must pour, the current art requires the container into which the liquid pours to be a specific height. The current art, U.S. Pat. No. 6,227,101, secures the server in the coffee maker with "a pair of spaced apart fingers." This mechanism can only engage servers of a specific height. This forces the operator to use specific servers with specific height geometry. Also, the current art is difficult to clean due to the use of a fixed brew tray. This requires cleaning of the "tray access port" which is difficult to access.

SUMMARY

In accordance with one embodiment, level sensor probes rotate to a downward position when a server comes in contact with a sensor head ring which is part of a brew cup/sensor head assembly. The level sensor probes pivot about a sealed shaft when the sensor head ring pushes on one end of the probes. When a lever is raised the brew cup/sensor head is unlocked and moves upward away from the server. The sensor head ring moves to the lower position since the server is no longer pushing it up. As the sensor head ring lowers it ceases to push on the probes. Torsion springs attached to the sealed shaft rotate the probes to the upward position to avoid impact with the server when the server is removed from the coffee maker. While the fluid level probes are in the up position, electric continuity of the probes is verified when the probes touch contacts in the brew cup/sensor head housing. The present invention eliminates the gap between the brew cup exit and the server by moving the brew cup and sensor head to the server as a unit. This prevents spillage when brewing a beverage in non-horizontal flight and makes the coffee maker easier to clean. Having both the brew cup and sensor head move together and lock at any height allows a coffee maker to use a variety of servers of different heights.

DRAWINGS

Figures

Figure 1:
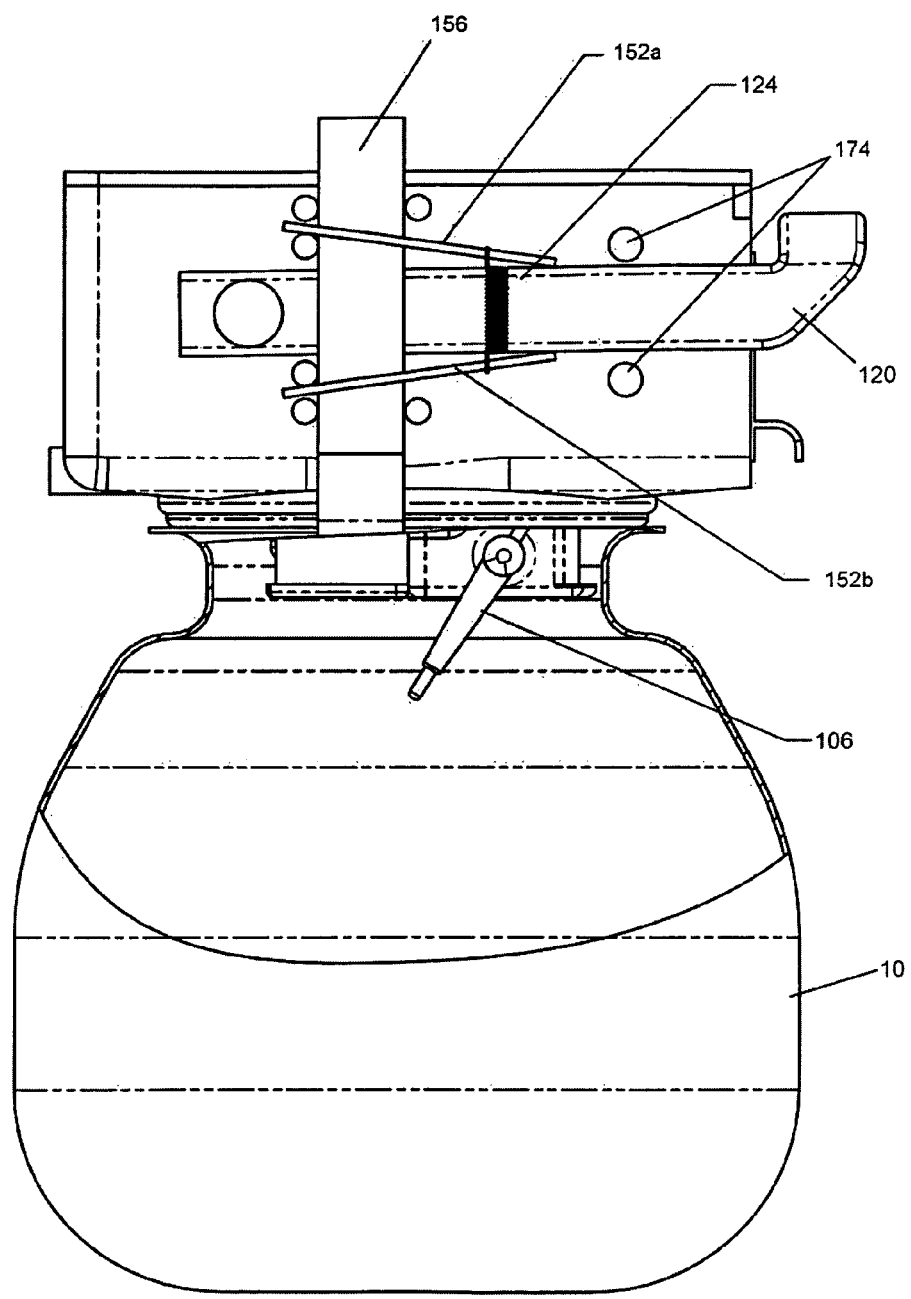
FIG. 1 shows the probes in the downward position with the server and locking lever.

REFERENCE NUMERALS 10 server
100 sensor head/brew cup
102 sensor head
104 sensor head ring
106 probes
108 sealed shaft
110 torsion spring 112 contacts
114 brew cup
116 coffee packet
118 sensor probe wire
120 lever
122 locking mechanism
124 spring
130 controller
150 housing
152 locking plate
154 locking plate holes
156 guide rail
157 guide rail pegs
158 sealed cavity
160 sealed rotation joint
162 spring channel
164 holes in sealed cavity
166 ring guide
168 ring stop
172 lever pivot point
174 lever stop

DETAILED DESCRIPTION

The present invention provides for an apparatus for a beverage maker that allows servers of various heights to be used, that has a probe continuity test circuit, and has a reliable sensor head that detects the surface of a liquid in a container with an upper opening, such as a server for a beverage maker on an aircraft.

Figure 2:
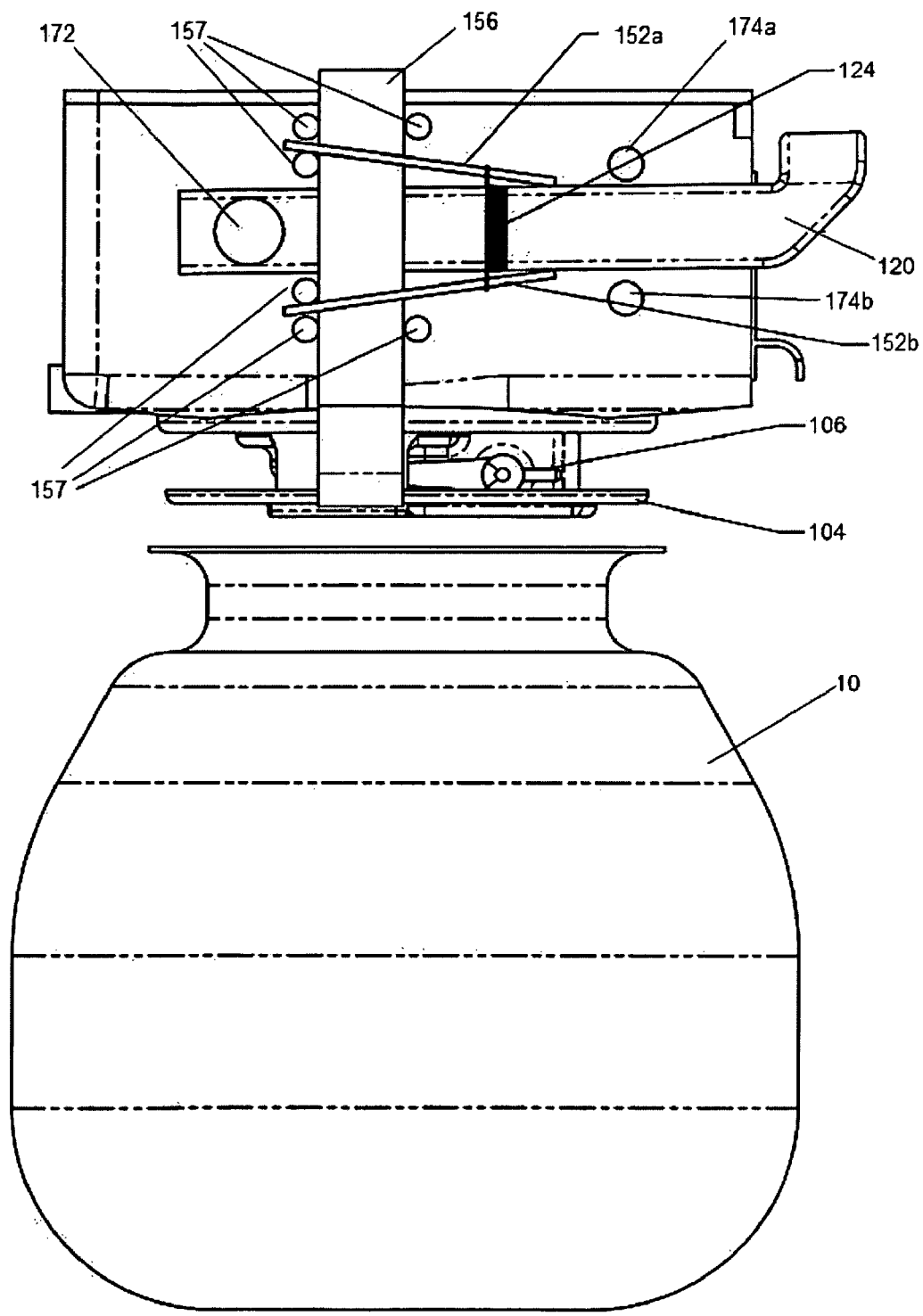
FIG. 2 shows the probes in the upward position with the server and locking lever.
Figure 3:
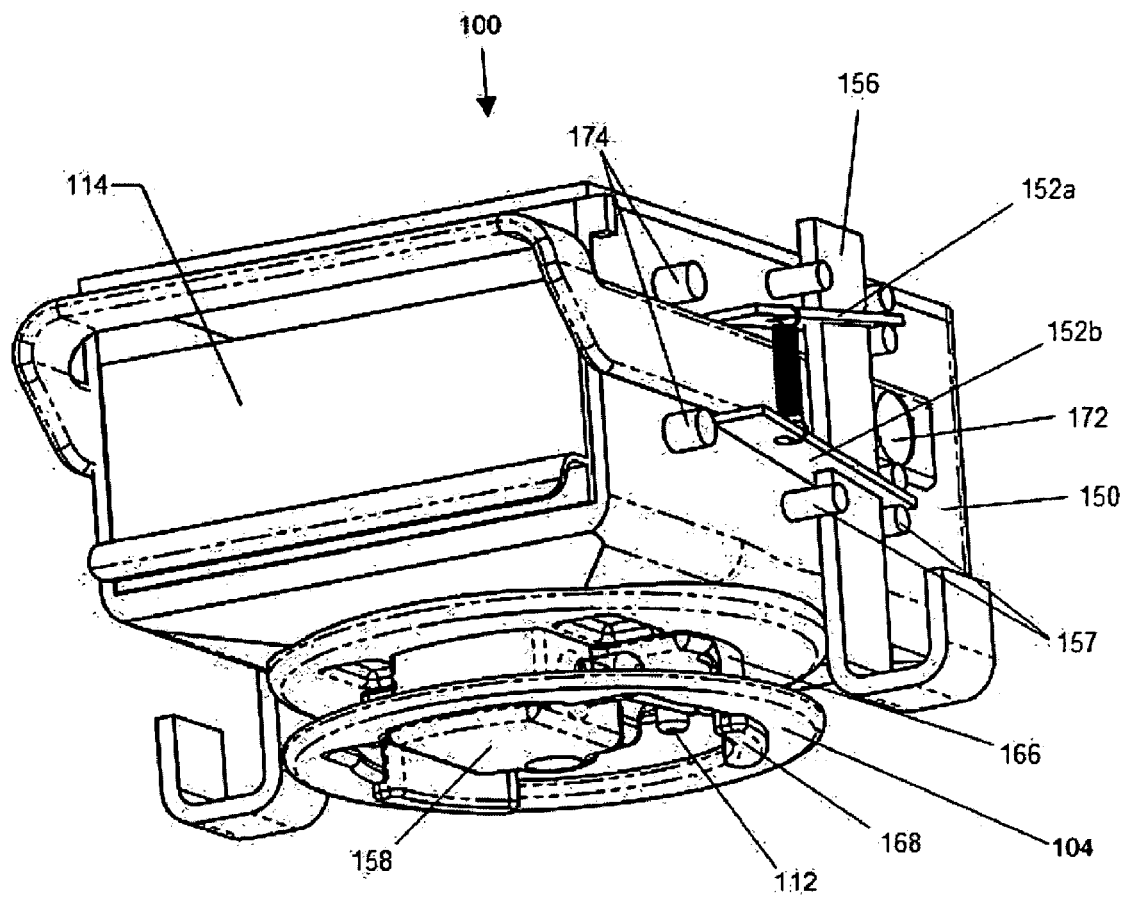
FIG. 3 shows the sensor head/brew cup with the sensor head ring down.
Figure 4:
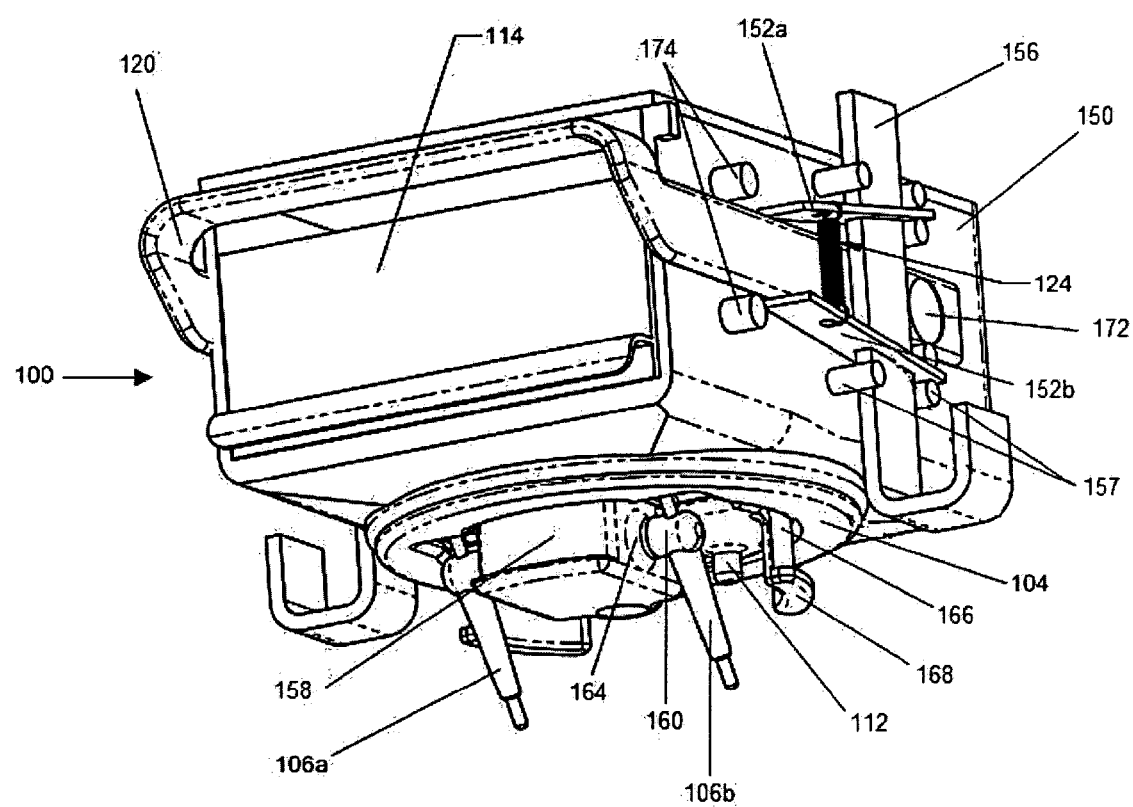
FIG. 4 shows the sensor head/brew cup with the sensor head ring up.
Figure 5:
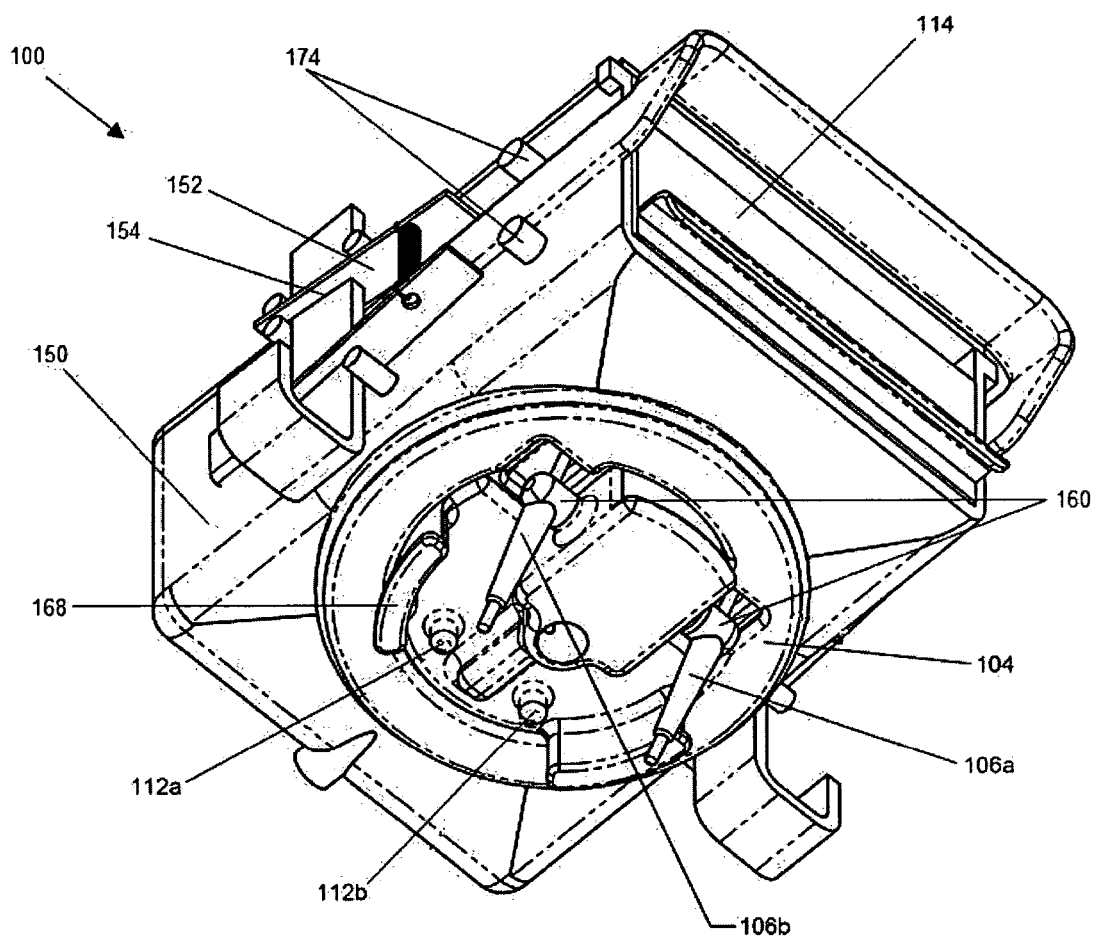
FIG. 5 shows the details of the sensor head/brew cup.
Figure 6:
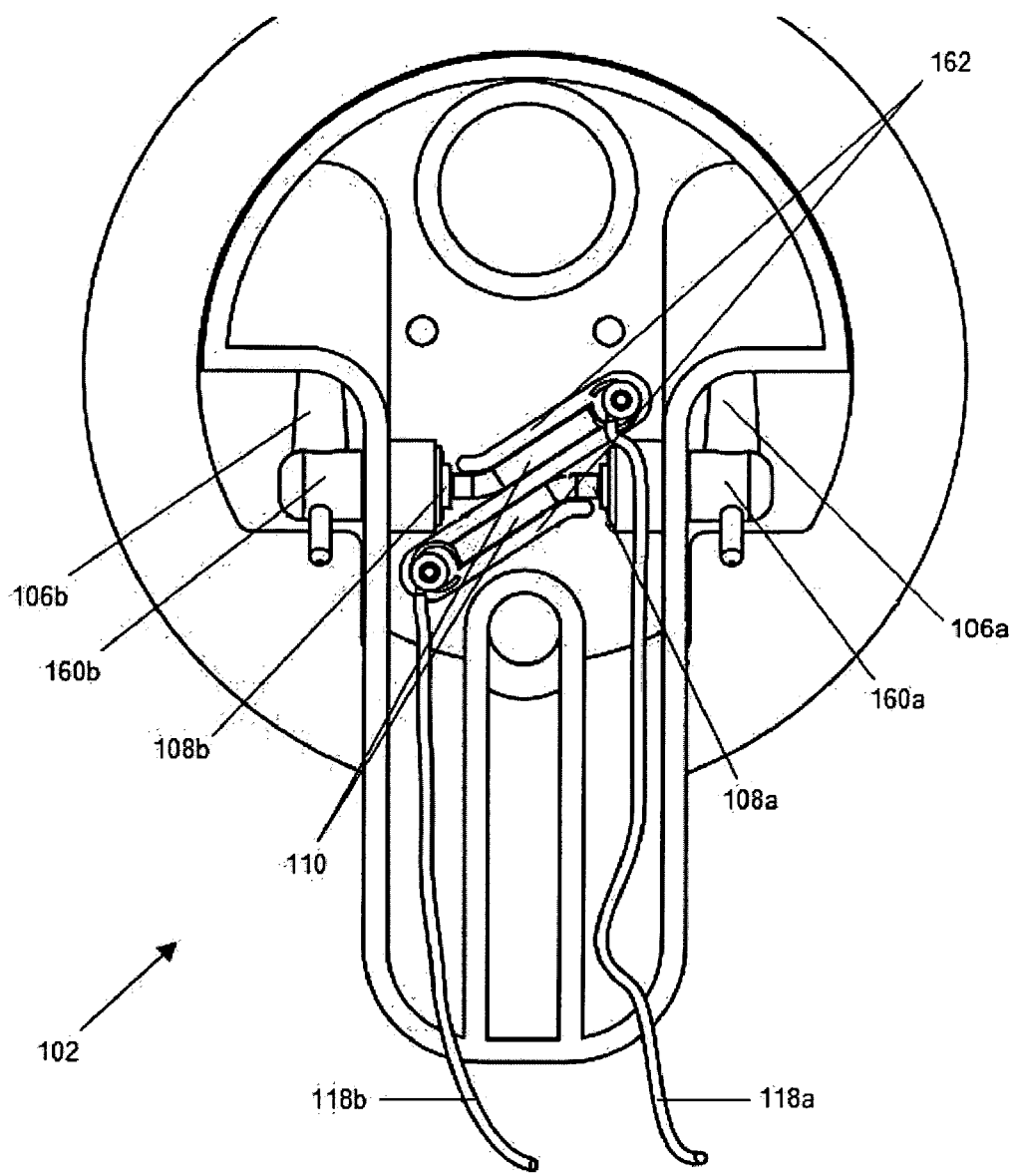
FIG. 6 shows details of the sensor head.

One embodiment of a moveable brew cup and sensor head assembly is illustrated in FIGS. 1-6. The sensor head/brew cup 100 comprises a housing 150, a brew cup 114, and sensor head 102. The brew cup 114 slides into housing 150 and holds a coffee packet 116. Sensor head 102 has two electrically conductive probes 106 connected via sealed rotation joints 160 with electrically conductive sealed shafts 108. Housing 150 has a sealed cavity 158 containing two torsion springs 110. Torsion springs 110 are held in place inside sealed cavity 158 by spring channels 162. One end of torsion springs 110 are fixed by a screw and connected electrically to sensor probe wire 118 as shown in FIG. 6. Sealed shafts 108 are inserted through holes 164 in the sealed cavity 158 in such manner to retain the sealed shafts 108 and allow the sealed shafts 108 to rotate in the sealed rotation joints 160. The ends of sealed shafts 108 inserted into sealed cavity 158 are connected to the ends of torsion springs 110 that are not fixed. The connection between torsion springs 110 and sealed shafts 108 is electrically conductive. There is electrical continuity from probes 106 to sealed shafts 108 to torsion springs 110 to probe wire 118 with all connections being solid, that is without any electrical slip joints which could become contaminated and build up electrical resistance. Sensor head 102 also has a sensor head ring 104 capable of vertical movement. FIG. 3 shows sensor head ring 104 in the downward position and FIG. 4 shows sensor head ring 104 in the upward position. Sensor head ring 104 slides freely in the vertical direction along ring guide 166. When in the downward position sensor head ring 104 is supported by ring stop 168 as shown in FIG. 3. As illustrated in FIG. 4, when sensor head ring 104 is in the upward position it pushes on a portion of probes 106 that extends past sealed rotation joints 160 causing probes 106 to rotate about sealed shafts 108 to a downward position and putting torsion springs 110 in tension. When sensor head ring 104 is in the downward position it no longer pushes on probes 106 and torsion springs 110 rotate sealed shafts 108 bringing probes 106 to the upward position.

When probes 106 are in the upward position they touch electric contacts 112 which are mounted in housing 150 as shown if FIG. 5. An electric circuit is made when probes 106 touch contacts 112. This circuit is formed by contacts 112 to probes 106 to sealed shafts 108 to torsion springs 110 to sensor probe wire 118. This circuit can be used to check for electrical continuity in the sensor head 102. An indicator light alerts an operator whether the apparatus is functioning properly or that it has a fault.

The present invention allows the operator to use servers of various heights in the coffee maker. This is accomplished by allowing the brew cup and sensor head to move as a unit. A locking mechanism 122 (brake) is used to hold the sensor head/brew cup 100 in a multitude of positions, thus allowing the use of servers of various heights. The sensor head/brew cup 100 moves along guide rail 156 as shown in FIGS. 1 through 3 and is restrained to move only vertically along guide rail 156 by guide rail pegs 157 as shown in FIG. 4. Also shown in FIG. 4, guide rail pegs 157 are attached to housing 150 and guide rail pegs 157 are situated on either side of guide rail 156. The guide rail 156 and guide rail pegs 157 serve another purpose. As illustrated in FIG. 4, a locking mechanism 122 is comprised of locking plates 152, springs 124, guide rail pegs 157, guide rail 156, lever 120, and lever pivot point 172. Guide rails 156 are inserted into locking plate holes 154 in locking plates 152. Locking plate holes 154 are shaped such that locking plates 152 bind against guide rails 156 when locking plates 152 are moved to a position not perpendicular to guide rail 156. As seen in FIG. 4, one end of the locking plates 152 are held in position between two guide rail pegs 157 on one side of the guide rail. This allows locking plates 152 to pivot about this end, and the other end of locking plates 152 are in contact with lever 120. The locking plates 152 are held in position against lever 120 by spring 124 which is attached to the ends of locking plates 152 in contact with lever 120. Spring 124 pulls ends of locking plates 152 towards each other. This causes the upper locking plate 152a to be oriented such that binding occurs against guide rail 156 when trying to raise the sensor head/brew cup assembly 100 and causes lower locking plate 152b to be oriented such that binding occurs against guide rail 156 when trying to lower the sensor head/brew cup assembly 100.

Lever 120 pivots about lever pivot point 172 which is attached to housing 150. Lever stops 174 limit how far lever 120 can rotate about lever pivot point 172. When raising lever 120 locking plate 152a pivots upward and becomes more perpendicular with guide rail 156. When lever 120 contacts lever stop 174a then locking plate 152a is perpendicular to guide rail 156 and no longer binds against guide rail 156 allowing the sensor head/brew cup assembly 100 to be raised, sliding along guide rail 156.

When lowering lever 120 locking plate 152b pivots downward and becomes more perpendicular with guide rail 156. When lever 120 contacts lever stop 174b then locking plate 152b is perpendicular to guide rail 156 and no longer binds against guide rail 156 allowing the sensor head/brew cup assembly 100 to be lowered, sliding along guide rail 156. When raising and lowering the sensor head/brew cup 100 the user may position the sensor head/brew cup 100 at any position along the travel length of the guide rail 156. When releasing lever 120 spring 124 pulls the ends of locking plates 152 towards each other thereby causing them to bind against guide rail 156, thus locking the sensor head/brew cup 100 in position.

Lever 120 is mass balanced about lever pivot point 172 preventing lever 120 from rotating about lever pivot point 172 due to aircraft accelerations (g-loads). Lever 120 will not rotate about lever pivot point 172 due to any loads applied to lever 120 due to aircraft acceleration since the resulting force is evenly applied to lever 120 about pivot point 172. Therefore the locking plates 152 remain locked and work in opposite directions opposing any movement of the sensor head/brew cup assembly 100 due to aircraft acceleration.

Operation

A clean empty server 10 is placed in the coffee maker. A coffee packet 116 is put into the brew cup 114. Referring to FIGS. 1 and 4, lever 120 is lowered causing the sensor head ring 104 to make contact with the server 10 causing the sensor probes 106 to rotate down into the server 10. This is achieved by the sensor head ring 104 raising and pushing on the back end of probes 106 causing them to rotate about sealed shaft 108 into the downward position. When the sensor head ring 104 is in the upward position a switch is activated as part of an interlock to prevent the coffee maker from dispensing fluid when there is not a server in place with lever 120 in the locked position. When the server 10 is full, the fluid in the server 10 makes contact with the two fluid level probes 106. This completes a circuit through an electronic controller via torsion springs 110 and sensor probe wires 118. The controller closes a solenoid valve that is filling the server 10. Lever 120 is raised by the operator thereby raising the sensor head/brew cup 100 away from the server 10. The sensor head ring 104 ceases contacting the server 10. Sensor head ring 104 lowers along ring guide 166 until it stops against ring stop 168. The sensor head ring 104 no longer pushes on probes 106. This causes the probes 106 to rotate into the up position, shown in FIG. 2, by means of the torsion spring 110, away from the server 10 and to touch the contacts 112 in the sensor head 102 as shown in FIG. 5. The appropriate indicator is lit depending on the electrical continuity of the fluid level probes 106 through torsion springs 110 and sensor probe wires 118 shown in FIG. 6. The server 10 is removed from the coffee maker by the operator.

Advantages

From the description above, a number of advantages of some embodiments of our sensor head/brew cup become evident:

(a) Reliability of a coffee maker will be increased due to the retractable fluid level sensor probe design. Eliminating flexing and repeated impacts on the fluid level probes from the server will increase the reliability of the coffee maker. Eliminating the possibility of the fluid level probes being outside of the server due to spring mounted probes being out of position when the server is not fully in place. Eliminating the IRED level sensors which are prone error detecting the fluid level surface. Eliminating overflow due to metal linkage type probes becoming contaminated and therefore losing electrical continuity between links.

(b) An indicator will alert the operator if probe electrical continuity is disrupted, thereby preventing the coffee maker from overflowing the server.

(c) Having the brew cup and sensor head move as a unit eliminates the gap between the brew cup and the server, thereby eliminating spillage of beverage flowing from the brew cup across a gap and into the server. In the current art, this gap must be kept as small as possible, thereby requiring a fixed server height. The present invention eliminates this gap entirely.

(d) A server locking mechanism that can lock servers of various heights, allowing a variety of servers to be used in the same coffee maker.

Description and Operation of Alternative Embodiments

Probes: The probes 106 could be raised and lowered without pivoting. The probes 106 could be rotated upward by means other than a torsion spring 110, i.e. other spring type, magnets, etc.

Server locking mechanism: The locking mechanism 122 could use brake pads and friction to lock the integrated sensor head/brew cup 100 in position instead of the locking plates 152.

Lever: Lever 120 could be replace by a push-pull device which pushes locking plates 152 to a more horizontal position thereby causing them to cease binding against guide rails 156.

CONCLUSIONS, RAMIFICATIONS, AND SCOPE

The reader will see that, according to one embodiment of the present invention, we have provided a sensor head/brew cup with retractable probes that improves the reliability of a coffee maker. This reliability improvement is due to the probes not being impacted by the server and not relying on IRED sensors that are prone to error in detecting a liquid surface. The sensor head has a built-in self check to confirm electrical continuity of the fluid level probes. Reliability is also improved through a moveable sensor head/brew cup which eliminates a source of spillage. In addition to these reliability improvements, the present embodiment provides a server locking mechanism with the ability to secure servers of various heights. While the above description contains many specificities, these should not be construed as limitations on the scope of any embodiment, but as exemplifications of the presently preferred embodiments thereof. Many other variations are possible within the teachings of the various embodiments. Thus the scope of the invention should be determined by the appended claims and their legal equivalents, and not by the examples given.

We claim:

1. An apparatus for a beverage brewing device with a moveable sensor head/brew cup assembly capable of being locked in innumerable positions, that apparatus comprising:
    (a) a sensor head/brew cup,
    (b) a plurality of guide rails or a single guide rail along which said sensor head/brew cup can travel and be lowered onto a container with an upper opening,
    (c) a locking device which by means causes said sensor head/brew cup to become fixed along said guide rails and when said sensor head/brew cup is in contact with said container, secures said container in place, and
    (d) a lever to move said sensor head/brew cup vertically along said guide rails and which by means said lever releases said locking device when moved up or down and said locking device locks when said lever is not moved,
    whereby said sensor head/brew cup secures said container of various heights when in contact with said container and said locking device is locked.

2. The apparatus of claim 1, wherein said locking device comprises of:
    (a) locking plates with holes that allow said locking plates to move along said guide rails and said holes cause said locking plates to bind against said guide rails when said locking plates are not perpendicular to said guide rails,
    (b) one end of said locking plates being restrained by means but being allowed to pivot, and
    (c) springs attached to one end of said locking plates, opposite the ends of said locking plate which are allowed to pivot, said springs causing said locking plates to pivot to a non-perpendicular orientation with respect to said guide rails, thereby causing said locking plates to bind against said guide rails, whereby said locking device fixes said sensor head/brew cup in position along said guide rails.

3. The apparatus of claim 1 wherein,
(a) the means by which said lever releases said locking device when said lever is moved in the upward direction is comprised of said lever pivoting an upper locking plate to a more perpendicular orientation relative to the said guide rail thereby causing said upper locking plate to no longer bind against said guide rail, and
(b) the means by which said lever releases said locking device when said lever is moved in the downward direction is comprised of said lever pivoting a lower locking plate to a more perpendicular orientation relative to the said guide rail thereby causing said lower locking plate to no longer bind against said guide rail.

4. The apparatus of claim 1 wherein said lever is mass balanced about a lever pivot point, whereby said lever will not rotate about said pivot point due to acceleration being applied to the apparatus.

5. The apparatus of claim 1 wherein said beverage brewing device is for aircraft.

6. An apparatus for a beverage brewing device for detecting liquid level in a container having an upper opening, that apparatus comprising:
(a) a housing,
(b) a plurality of electrically conductive probes, each said probe being attached to said housing by an electrically conductive shaft and a rotation joint,
(c) means for causing said probes to rotate to a downward position about said shafts when said apparatus is in contact with said container, and
(d) means for causing said probes to rotate to an upward position about said shafts when said apparatus is not in contact with said container,
whereby said probes rotate downward into said container when said apparatus is in contact with said container and said probes rotate upward out of said container when said apparatus is not in contact with said container.

7. The apparatus of claim 6, wherein said means for causing said probes to rotate to a downward position about said shafts comprises a sensor head ring which when in contact with said container pushes upward on one end of said probes causing the opposite end of said probes to rotate to a downward position, whereby said probes rotate downward into said container when said apparatus is in contact with said container.

8. The apparatus of claim 6, wherein said means for causing said probes to rotate to an upward position about said shafts comprises torsion springs with one end of said springs being attached to said housing and the other end of said springs being attached to said shafts, such that said springs are put into torsion by said shafts when said probes are rotated into a downward position and said springs in torsion cause said probes to rotate about said shafts to an upward position, whereby said torsion springs cause said probes to rotate upward out of said container.

9. The apparatus of claim 8 wherein said torsion springs are contained in a sealed cavity.

10. The apparatus of claim 8 wherein said springs are electrically conductive and sensor probe wires are connected to said torsion springs creating an electrical circuit from said probes, to said shafts, to said springs, to said sensor probe wires, whereby said probes can detect liquid level in said container when said probes are in a downward position.

11. The apparatus of claim 10 further comprising:
(a) an indicator such as a light, and
(b) electrical contacts attached to said housing such that said probes touch said contacts when said probes are in an upward position,
whereby when electrical continuity is present in said electrical circuit said indicator light is turned either on or off indicating electrical continuity is present.

12. The apparatus of claim 6 further comprising:
(a) an indicator such as a light,
(b) electrical contacts attached to said housing such that said probes touch said contacts when said probes are in an upward position, and
(c) sensor probe wires connected to said shafts,
whereby when electrical continuity is present from said conductive probes to said conductive shafts and to said sensor probe wires, said indicator is turned either on or off indicating electrical continuity is present.

13. The apparatus of claim 6 wherein said rotation joint is sealed to prevent contamination.

14. An apparatus for a beverage brewing device with a sensor head/brew cup capable of being moved vertically to innumerable positions such that said sensor head/brew cup can be lowered onto a container with an upper opening, whereby heated water flows through said sensor head/brew cup and directly into said container without traversing a gap between said sensor head/brew cup and said container, thereby eliminating spillage.

* * * * *